United States Patent [19]
Hildreth, Jr.

[11] 3,951,384
[45] Apr. 20, 1976

[54] IMPACT ABSORBING DEVICE

[76] Inventor: Robert E. Hildreth, Jr., 6841 E. 6th St., Scottsdale, Ariz. 85257

[22] Filed: Mar. 20, 1975

[21] Appl. No.: 560,228

[52] U.S. Cl. .................................. 256/1; 114/219; 293/71 R; 404/9
[51] Int. Cl.² ........................................ E04H 17/00
[58] Field of Search .................. 293/1, 71 R, 88; 114/219, 220; 256/1, 13.1; 404/9

[56] References Cited
UNITED STATES PATENTS

| | | | |
|---|---|---|---|
| 2,413,210 | 12/1946 | Blackman | 114/219 |
| 2,562,957 | 8/1951 | Sipkin et al. | 114/219 |
| 3,845,936 | 11/1974 | Boedecker et al. | 114/219 X |

Primary Examiner—Stanley H. Tollberg
Assistant Examiner—John P. Shannon
Attorney, Agent, or Firm—Drummond, Nelson, & Ptak

[57] ABSTRACT

A deformable elongate upright hollow cylindrical body is formed by a plurality of concentrically stacked tire casings which are bound together by cables. Retaining anchors, each having an eye encircling one of the cables, holds the cylindrical body in a predetermined position to function as a vehicle barrier. Used, empty crushable containers within the hollow body provide additional energy absorption. A barricade wall is fabricated from several deformable bodies, each in tangential contact and secured by additional cables.

4 Claims, 5 Drawing Figures

IMPACT ABSORBING DEVICE

This invention relates to safety devices and more particularly to kinetic energy absorbing safety barricades for reducing or preventing damage to persons and property upon collision of an automobile or other vehicle.

Devices of this general character are known in the prior art for absorbing the kinetic energy of colliding vehicles. It is common practice, for example, to fabricate an energy-absorbing barrier from salvaged tire casings. However, present means for securing the tires together generally requires some type of alteration to the casings, such as boring holes through the side walls and the addition of other structural units. Other devices exist where the entire structure is produced from new raw materials, thereby negating the advantage of re-using discarded articles and adding substantially to the expense of manufacture. Heretofore, no such devices have been proposed which do not require especially designed components or alterations to salvaged components.

It would be highly advantageous, therefore, to remedy the deficiencies of the prior art and provide an impact absorbing barricade which is readily constructed from salvaged materials.

Accordingly, it is a primary object of the present invention to provide an impact absorbing barricade which is readily constructed from abundantly available discarded materials and which does not require special preparation or alteration of the discarded material.

Another object of the present invention is the provision of an impact absorbing barricade which is deformable and crushable upon impact with a vehicle for the reduction or prevention of damage and injury to the vehicle and the occupants thereof.

Still another object of the invention is to provide a barricade which is economically fabricated from hitherto generally discarded material, including empty containers and discarded tire casings.

Yet another object of the instant invention is the provision of a vehicle barricade which utilizes the impact absorbing properties inherent in the deformity and crushability of selected salvaged materials.

Yet still another object of the present invention is to provide a use for various discarded material which heretofore has been considered scrap or litter.

A further object of the present invention is to provide an energy absorbing device of the above type which can be readily and firmly secured to the ground or to an upstanding hazard.

And still a further object of the present invention is to provide an energy absorbing device in modular form whereby two or more of the modules may be secured together to construct an impact absorbing barricade of predetermined configuration.

Briefly, to achieve the desired objectives of the present invention, a plurality of used whole tire casings are concentrically arranged in side wall contact and stacked, each horizontally, to form a deformable elongate upright hollow cylindrical body. Spaced cables encircling the wall formed by the stacked casings pass through the eye of an anchor for holding the tires together and for affixing the deformable body to a predetermined surface. The hollow center of the deformable cylindrical body is filled with empty crushable containers to increase the impact energy absorption property thereof.

The foregoing and further and more specific objects and advantages of the instant invention will become readily aparent to those skilled in the art from the following detailed description thereof, taken in conjunction with the drawings, in which.

Figure 1:
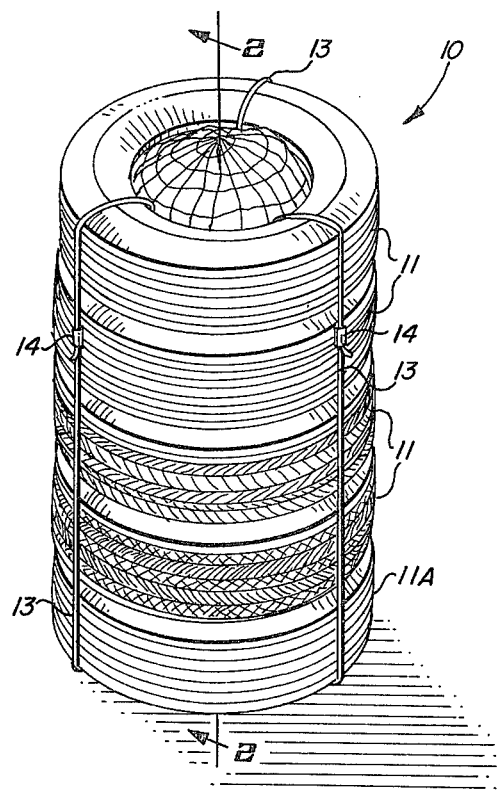
FIG. 1 is a perspective view of an energy absorbing device constructed in accordance with the teachings of the present invention.

Referring now to the drawings, in which the same reference numerals indicate corresponding elements throughout the several views, attention is first directed to FIG. 1, which illustrates a deformable elongate upright hollow cylindrical body, generally designated by the reference character 10, fabricated from a plurality of used whole tire casings 11. The casings are stacked concentrically to any desired height by placing a first casing 11a horizontally and placing additional cassings 11 thereon with the side walls 12 thereof in surface contact. Cables encircle the casings to maintain the stacked arrangement. The ends of each cable are secured by a conventional cable clamp 14. As used herein, the term cable refers to any of various flexible securement media, such as wire stranded cable, rope or chain.

Figure 2:
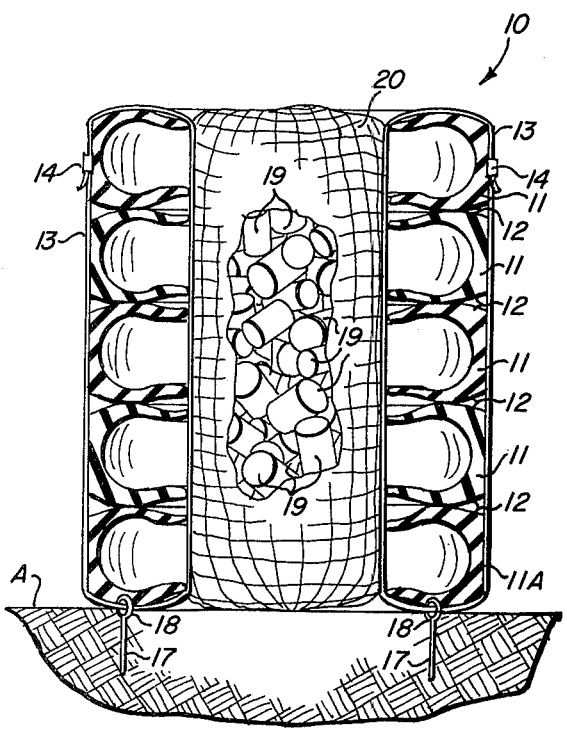
FIG. 2 is a vertical sectional view taken along the line 2—2 of FIG. 1 and further revealing the construction thereof.

As seen in FIG. 2, the energy absorbing unit 10 is placed upon a horizontal surface A, such as the ground or a concrete pad. Anchors 17, each having an eye 18 and being of a commercially available type, are imbedded into the support medium below surface A. Cables 13 at the nethermost portion thereof pass through eyes 18 for affixing device 10 to a predetermined surface location. A plurality of used empty crushable containers 19, such as metallic cans and plastic bottles, substantially fill the interior of the hollow body 10 formed by casings 11. A bag 20, herein illustrated as preferably made of netting, encloses containers 19 to prevent dislodgement from within the hollow body and also to facilitate handling.

Figure 3:
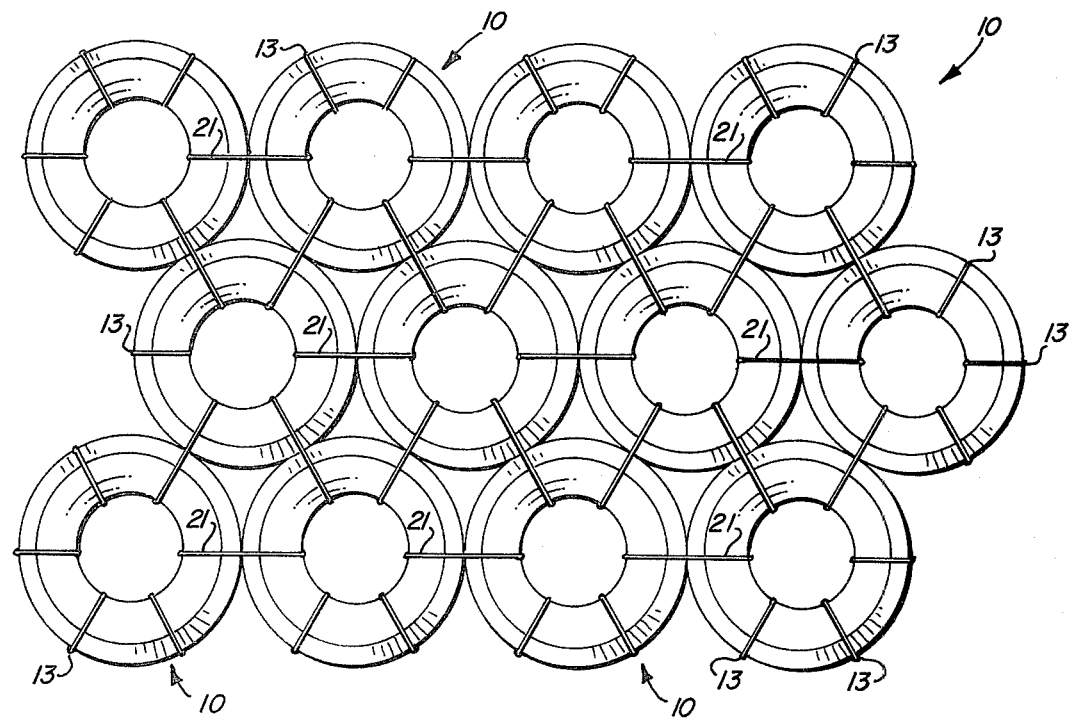
FIG. 3 is a plan view of a plurality of the devices of FIG. 1 arranged to form a barricade wall.

A barricade of predetermined width and length is formed, as illustrated in FIG. 3, by arranging a plurality of energy absorbing units 10 such that each unit is in tangential contact with each adjacent unit. Auxiliary cables 21 similar to the hereinbefore described cables 13 encircle adjacent units 10 at the point of tangency thereof. Where cables 21 coincide with cables 13, the latter may be omitted. Anchors 17 may also be used in connection with cables 21. It will be appreciated that the barricade provided by a multiplicity of units 10 can be formed into any desired shape to follow a predetermined contour or for a specialized purpose.

Figure 4:
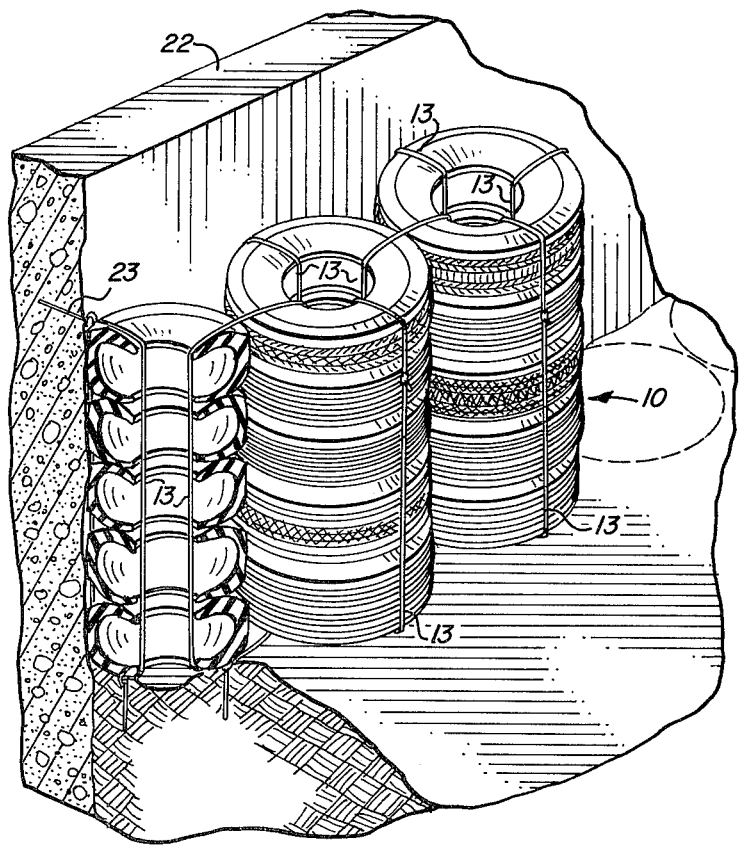
FIG. 4 is a perspective view, partly in section, particularly illustrating a preferred method of utilizing a plurality of the devices of FIG. 1 as a safety device in connection with a vertical wall.

As seen in FIG. 4, the energy absorbing units 10 are used in connection with a vertical wall 22. Auxiliary anchors 23 engaged with cable 13 provide additional stability to prevent relative movement between unit 10 and wall 22. In the configuration of FIG. 4, units 10 can be attached to either the side of a ship or a dock to provide a boat fender or as a safety precaution in combination with an abuttment or other upstanding hazard. In accordance with the arrangement of FIG. 3, additional units may be deployed in combination with the units shown in FIG. 4.

Figure 5:
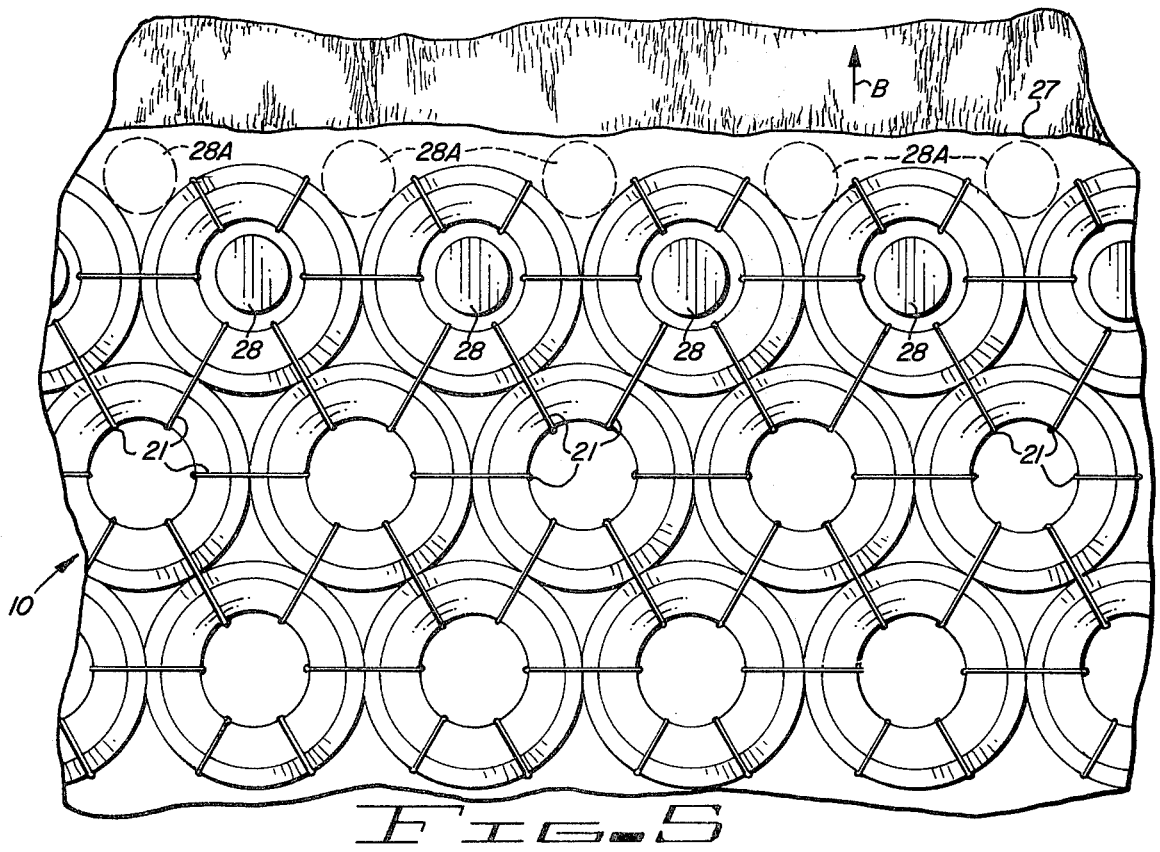
FIG. 5 is a plan view illustrating a method of providing a safety barricade utilizing the energy absorbing devices of the present invention in combination with an earthen barricade.

FIG. 5 illustrates a preferred embodiment of a barrier which is particularly adapted to be used as a freestanding unit to prevent a vehicle from plunging over an embankment 27 sloping downhill in the direction of the arrow B therefrom. The barrier is constructed similarly to the arrangement as illustrated in FIG. 3 utilizing a plurality of energy absorbing units 10 secured one to the other by auxiliary cables 21. Upstanding posts 28 extend through each unit 10 of the rearmost row thereof and are firmly imbedded into the ground. Posts 28 provide uniform backing and support throughout the vertical length of the barrier. Additional support posts, shown in dashed outline 28a, may be employed where particularly high energy impact is anticipated.

The practicality of feasibility of the invention as hereinbefore described will become immediately apparent to those skilled in the art. Tire casings have excellent resilient properties which are inherently energy absorbing and dissipating. The crushability of the containers therein increases the energy absorption ability of the device. In accordance with the objects of the instant invention, the barricade is fabricated with negligible material cost except for the necessary cable. In addition, a feasible use is provided for otherwise scrap material.

Various modifications may be made by one choosing to practice the invention without departing from the scope thereof. For example, selected anchors 17 may be omitted in larger barriers without detracting from the ability thereof to deform and absorb the kinetic energy of an object striking the barricade. Also, anchor means differing from those herein particularly illustrated would be used to secure such barricades suspended above water, such as at the side of a dock or upon a ship, and bottoms installed in the units 10 to keep the crushable containers from dropping therethrough.

Having fully described and disclosed the present invention and the preferred embodiment thereof in such clear and concise terms as to enable those skilled in the art to understand and practice the same, the invention claimed is:

1. An energy absorbing device fabricated substantially of salvaged material for receiving the impact of a moving vehicle and dissipating at least a portion of the kinetic energy thereof by deformation, said energy absorbing device comprising:
   a. a plurality of concentrically arranged and stacked used whole tire casings, each positioned horizontally having the side wall thereof in surface contact with the side wall of each adjacent casing to form a deformable elongate upright hollow cylindrical body;
   b. securement means including at least three equally spaced cable members each encircling the side wall of said hollow cylindrical body for holding said casings in said stacked arrangement;
   c. at least one used empty crushable container within said hollow cylindrical body; and
   d. anchor means for affixing said cylindrical body to a predetermined surface.

2. The energy absorbing device of claim 1, wherein said anchor means includes an eye encircling said cable means.

3. The energy absorbing device of claim 1, including a plurality of empty crushable containers held within said hollow cylindrical body.

4. The energy absorbing device of claim 3, further including a deformable bag enclosing said containers.

* * * * *